United States Patent [19]

Cooke

[11] 3,971,501

[45] July 27, 1976

[54] METHOD OF BRAZING ALUMINUM

[75] Inventor: William Ernest Cooke, Kingston, Canada

[73] Assignee: Alcan Research and Development Limited, Montreal, Canada

[22] Filed: Apr. 9, 1975

[21] Appl. No.: 566,299

[52] U.S. Cl. .................................................. 228/248

[51] Int. Cl.$^2$ .......................................... B23K 35/12

[58] Field of Search ........... 228/248, 245, 263, 214, 228/223, 224

[56] References Cited

UNITED STATES PATENTS

| | | | |
|---|---|---|---|
| 2,171,041 | 8/1939 | Michel | 228/223 |
| 2,686,354 | 8/1954 | Lundin | 228/223 X |
| 2,909,643 | 10/1959 | Graves | 228/224 X |
| 3,001,277 | 9/1961 | Giovannucci | 228/223 X |
| 3,432,910 | 3/1969 | Botlum | 228/248 X |

*Primary Examiner*—Al Lawrence Smith
*Assistant Examiner*—Margaret Joyce
*Attorney, Agent, or Firm*—Cooper, Dunham, Clark, Griffin & Moran

[57] ABSTRACT

A mixture of powdered aluminum brazing alloy and a powdered flux consisting essentially of potassium fluoaluminate complexes is applied, in an aqueous vehicle, to aluminum surfaces which are to be joined, and the surfaces are then heated to brazing temperature while being maintained in juxtaposed relation to produce a brazed joint.

9 Claims, No Drawings

METHOD OF BRAZING ALUMINUM

BACKGROUND OF THE INVENTION

This invention relates to methods of joining aluminum surfaces by brazing. As herein used, the term "aluminum" embraces aluminum metal and alloys thereof.

It is known to join aluminum components by disposing an aluminum brazing alloy between or adjacent the faying surfaces (i.e. the surfaces to be joined), and heating the brazing alloy and the faying surfaces in appropriately assembled relation to a temperature (herein termed "brazing temperature") at which the brazing alloy melts while the components remain unmelted. Upon subsequent cooling, the brazing alloy forms a fillet or joint that bonds the faying surfaces. For assured selective melting of only the brazing alloy in the heating step, it is commonly preferred that the melting point of the brazing alloy be at least about 30° to 40°C lower than that of the metal of the components. An example of a suitable aluminum brazing alloy is an Al-Si eutectic composition, which melts at about 577°C.

Frequently, one or both of the faying surfaces are pre-clad with a layer of aluminum brazing alloy. Such pre-clad articles (e.g. so-called brazing sheet) are, however, relatively costly, and in many instances it is preferred to provide the brazing alloy in some form other than a cladding. One alternative expedient heretofore proposed, and offering potential advantages of convenience and economy for a variety of brazing operations, is to apply the brazing alloy to or adjacent one or both faying surfaces in powdered or particulate form carried in a suitable liquid or pastelike vehicle. The present invention, in a specific sense, is particularly directed to improvements in brazing procedures including such use of powdered or particulate brazing alloy.

Although fluxless brazing procedures have been devised, their use is limited because of economic and other considerations arising from the special conditions and equipment required for successful practice of such procedures, It is, therefore, generally necessary to employ a flux in brazing aluminum, to remove the oxide ordinarily present on exposed metal surfaces (including brazing alloy surfaces) at the locality of the joint, as well as to promote flow of molten brazing alloy during the heating step, and, desirably, to inhibit further oxide formation. The material used as a flux must be capable of acting as a flux to dissolve and/or otherwise remove metal (e.g. aluminum) oxides at the brazing temperatures while remaining essentially inert with respect to aluminum at such temperatures. Since fluxes are usually reactive (i.e. capable of removing oxide) only when at least partially molten, fluxes for aluminum brazing should as a practical matter be partly or wholly molten at brazing temperatures, e.g. (in the case of use of the aforementioned Al-Si eutectic brazing alloy) at temperatures not substantially higher, and indeed preferably lower, than 577°C.

Flux materials heretofore commercially employed in brazing aluminum have commonly been mixtures of predominantly chloride salts, with minor additives of fluoride in some cases. These fluxes are water-soluble and are corrosive to aluminum in the presence of water; hence flux residue must be removed from brazed assemblies by washing at the end of the brazing operation. The washing step is not only inconvenient, but often is also not fully effective to remove all residual flux, as is necessary to prevent corrosion.

For use with a powdered brazing alloy, it has heretofore been proposed to provide a particulate chloride-containing flux in mixture therewith, i.e. again in a suitable vehicle, for simultaneous application to the faying surfaces of aluminum components which are to be joined by brazing. The selection of the vehicle has been limited to relatively costly organic liquids in which the chloride-containing flux does not attack the brazing alloy particles.

It has also been proposed to mix a powdered aluminum brazing alloy with finely divided aluminum fluoride ($AlF_3$), e.g. in an aqueous vehicle for coating surfaces of aluminum components prior to brazing. The utility of such procedures is limited, however, to so-called dip brazing, wherein the components and powdered brazing alloy are heated to brazing temperature while immersed in a molten salt bath. That is to say, mixtures of powdered brazing alloy and powdered aluminum fluoride cannot be used for furnace brazing, because the melting point of aluminum fluoride is far too high to enable it to serve as a flux, although when immersed in a molten salt bath, the aluminum fluoride dissolves therein and cooperates with other ingredients of the bath to provide fluxing action. As will be appreciated, for many types of brazing operations, dip brazing is unsuitable or at least uneconomical or inconvenient, as compared to furnace brazing, i.e. brazing operations wherein the assembly to be brazed is heated in a confined chamber, typically in an atmospheric of air or inert gas but in any event without immersion in a molten bath.

In the copending U.S. patent application of Eric Robert Wallace and Ernest William Dewing, Ser. No. 447,168 filed Mar. 1, 1974 for Joining of Metal Surfaces and assigned to the same assignee as the present application, there are disclosed fluxed consisting essentially of a mixture of potassium fluoaluminate complexes (typically $KAlF_4$ and $K_3AlF_6$) and essentially free of unreacted potassium fluoride. These fluxes are found to be especially advantageous for aluminum brazing, in that they are nonhygroscopic and leave no substantially water-soluble residue, and that at temperatures ranging upwardly from about 560°C they are reactive (i.e. effective to strip oxides from metal surfaces) while being essentially inert with respect to the metal of the surfaces and performing other usual flux functions, e.g. promoting flow of brazing alloy and preventing subsequent oxide formation. In addition, these fluxes, characterized by the essential absence of unreacted potassium fluoride, are substantially water insoluble. The use of these fluxes, therefore, overcomes problems associated with the aforementioned commercial chloride-containing fluxes, such as the necessity for washing a brazed assembly to remove flux residue and the possibility of corrosion resulting from unremoved flux residue.

Among other uses for these fluxes, the aforementioned copending application discloses mixtures of the flux in powdered form with a powdered aluminum brazing alloy in a resinous vehicle for application to aluminum parts to be brazed. While such use is satisfactory for various specific purposes, in other cases a resinous vehicle is undesirable in that the resin may leave a carbonaceous residue that is difficult or impossible to remove.

SUMMARY OF THE INVENTION

The present invention broadly contemplates the provision of an aluminum brazing method wherein a mixture of powdered alumunum brazing alloy and a powdered potassium fluoaluminate flux of the type mentioned above are applied to or adjacent the faying surfaces of aluminum components in an aqueous vehicle, the components being thereafter appropriately heated in assembled relation so that the brazing alloy powder melts and forms a brazed joint. After heating, the components are cooled to solidify the joint.

Specifically, the flux consists essentially of a mixture of potassium fluoaluminate complexes and is essentially free of unreacted potassium fluoride. The present invention embraces the discovery that, surprisingly in relation to what was known before concerning mixtures of fluxes and powdered aluminum brazing alloys, the potassium fluoaluminate complexes may be mixed and maintained with powdered aluminum brazing alloy in an aqueous vehicle for extended periods of time without deleteriously attacking the alloy particles. Thus an aqueous dispersion of the powdered flux and brazing alloy may be established and maintained for practicably long periods for application to aluminum components to be brazed. The advantages of an aqueous dispersion, as distinguished from the organic vehicles heretofore used for mixtures of other fluxes with powdered brazing alloy, include convenience and economy as well as ease of achieving complete removal of the vehicle by evaporation. That is to say, with water as the vehicle, no residue of the vehicle remains after brazing.

In the practice of the invention, the brazing alloy constitutes a major proportion of the mixture of flux and alloy powders; thus a typical and in many cases preferred ratio of brazing alloy to flux (in parts by weight) is about 4:1, although much higher ratios may be used especially when the surfaces to be brazed are heavily coated with the brazing mixture. The weight of water in which the powdered mixture is dispersed may be varied depending on the desired consistency of the dispersion, but is typically less than the weight of powder dispersed in it.

While various procedures for application of the dispersion may be employed, one such procedure for which the aqueous dispersion of flux and alloy is particularly well adapted, and which affords advantages of operational ease and convenience, is so-called immersion depositing, wherein the components to be brazed are immersed in a bath of the dispersion. Upon removal from the bath, the component surfaces are coated with the dispersion, and are ready to be joined by a simple (and e.g. conventional) furnace brazing operation.

Further features and advantages of the invention will be apparent from the detailed description hereinbelow set forth.

DETAILED DESCRIPTION

For purposes of specific illustration, the invention will be described with particular reference to embodiments wherein an aqueous dispersion of powdered aluminum brazing alloy and a powdered flux as hereinafter specified is applied by immersion depositing to the surface of aluminum components to be brazed, followed by furnace brazing of the components.

The flux employed in the practice of the invention consists essentially of a mixture of potassium fluoaluminate complexes essentially free of unreacted potassium fluoride. As herein used, "potassium fluoaluminate complexes" refers to complexes of the type formed by fusion of $AlF_3$ and KF, such complexes having the formulas $K_3AlF_6$ and $KAlF_4$ and being produced, for example, by mixing $AlF_3$ and KF in appropriate proportions and fusing the mixture to constitute the same as an intimate mixture of the complexes. X-ray diffraction examination of the solidified residue of the fused eutectic mixture of KF and $AlF_3$, which occurs at about 45.8% KF and 54.2% $AlF_3$, indicates that virtually all the fluoride contents are in the form of $K_3AlF_6$ and $KAlF_4$, which are very sparingly soluble in water and are nonhygroscopic. In fact, the fused eutectic consists of these two phases and not of KF and $AlF_3$.

It is to be understood that all percentages herein are expressed as percentages by weight, unless otherwise stated.

The liquidus point of a mixture of potassium fluoaluminate complexes varies depending upon the composition of the mixture, expressed as relative proportions of $AlF_3$ and KF, reaching a minimum (about 560°C) at the aforementioned eutectic composition. In a broad sense, the invention embraces the use as fluxes of intimate mixtures of potassium fluoaluminate complexes having a composition corresponding to an $AlF_3$/KF ratio, in parts by weight, between about 65:35 and about 45:55 (preferably between about 69:40 and about 50:50) and, as stated, essentially free of unreacted potassium fluoride. It is convenient, and in many cases preferred, to use a flux having a composition about equal to the aforementioned eutectic $AlF_3$/KF proportions, since the melting point of flux compositions in the neighborhood of that eutectic is below the melting point (about 577°C) of commonly used aluminum brazing alloy. However, other flux compositions within the broader composition limits stated above are also suitable for brazing aluminum, indeed even if the liquidus point thereof is somewhat above the melting point of the brazing alloy, so long as the flux becomes reactive (partially molten) at temperatures below the melting point of the metal of the surfaces to be joined. While the flux melting point shown in the published diagram (Journal American Ceramic Society, 49, pages 631–34, December 1966) rises very rapidly if the quantity of KF rises above that required for the eutectic, there is only a slight rise in melting point to about 574°C where the $AlF_3$ rises above the eutectic up to a total of about 60% (50 mole %$AlF_3$). For aluminum brazing operations, it is commonly preferred that the $AlF_3$/KF ratio be such that the flux becomes reactive at not more than about 600°C. Preferably, the flux is an intimate mixture of $K_3AlF_6$ and $KAlF_4$ corresponding to an $AlF_3$/KF ratio between about 60:40 and about 50:50, in parts by weight, essentially free of unreacted KF.

At compositions corresponding to an $ALF_3$ content below about 60%, the mixture of potassium fluoaluminate complexes, in dry state, consists essentially of $K_3AlF_6$ and $KAlF_4$. At higher levels of $AlF_3$ content within the stated range, the mixtures are constituted of $KAlF_4$ with some unreacted $AlF_3$ (which is insoluble in water) but, again, essentially free of unreacted KF; such mixtures ($KAlF_4$ with $AlF_3$) are embraced within the term "mixtures of potassium fluoaluminate complexes" as used herein. Minor amounts of other fluorides (e.g. LiF, NaF, or $CaF_2$) may be incorporated in the flux.

Because the fluxes used in the present invention are essentially free of unreacted potassium fluoride, the advantageous properties of a fluoride flux (e.g. an $AlF_3$-KF mixture) are realized without the problems (such as hygroscopicity and unsuitability for use in aqueous slurry) associated with unreacted potassium fluoride. In this connection it may be explained, with reference to the subject mixtures of potassium fluoaluminate complexes, that in the presence of water there is theoretically some dissolution of $K_3AlF_6$ and resultant appearance of minor amounts of unreacted KF. However, in practice, these theoretical quantities of KF (if indeed actually present, in water) are too small to produce any noticeable increase in hygroscopicity or other undesirable properties of the flux; hence the term "essentially free of unreacted KF" properly embraces the situation of the present flux compositions in water, notwithstanding the theoretically possible appearance of free KF therein in quantities which are insignificant from the standpoint of this invention.

A simple method of obtaining a flux for use with the present method is to fuse together $AlF_3$ and KF in correct proportions, allow the mix to solidify by cooling, and then grind the cooled mass to an appropriately small particle size. As an alternative, it is possible to mix previously separately prepared $K_3AlF_6$ and $KAlF_4$ (e.g. in particle form) in the required proportions, to produce the requisite intimate mixture, with further grinding if necessary, to achieve a desired small particle size. The preparation of $KAlF_4$ has been described by Brosset in Z. Anorg. Algem. Chemie, vol. 239, pages 301 – 304 (1938). Still further alternative methods for preparing flux compositions for use in the method of the invention include mixing and fusing previously separately prepared $KAlF_4$ and KF in appropriate relative proportions, or mixing previously separately prepared $K_3AlF_6$ and $AlF_3$ in appropriate proportions.

Small quantities of alkali- or alkaline-earth metal or zinc fluorides (i.e. other than KF), up to a total of about 5 mole %, can be tolerated, providing that the melting point of the flux is not raised excessively above that of the brazing alloy with which it is to be used. Specifically, it has been found that intimate mixtures of potassium fluoaluminate complexes essentially free of unreacted KF but containing minor amounts (i.e. not more than a total of about 5 mole %) of LiF, $CaF_2$, or NaF possess satisfactory properties for use as fluxes in aluminum brazing; for example, a composition having an analysis of 40.2% KF, 56.4% $AlF_3$, 3.4% $CaF_2$ (% by weight) had a liquidus temperature of 580°C, satisfactory for many fluxing purposes. However, the presence of such fluorides does not appear to confer any benefits by reducing the melting point below that of the KF/$AlF_3$ eutectic, and all have the effect of raising the melting point to some extent even where the KF/$AlF_3$ proportions have been adjusted to provide optimum melting point conditions.

For the practice of the present invention, the described flux is provided in a suitably finely divided solid form, i.e. as particles typically of −100 mesh (Tyler screen) size. A small particle size is desired for the flux to enable introduction of the flux particles between faying surfaces of preassembled components to be brazed during an immersion depositing step as hereinafter described, as well as to facilitate maintained suspension of the particles in water, and more generally to avoid the interference with necessary fit of the faying surfaces the might result if larger particles were used. The flux, in the particulate form appropriate for the present method, is referred to herein as powdered flux or flux powder.

For the same reasons, the brazing alloy is provided as a powder of small particle size, again preferably −100 mesh or even smaller, e.g. − 200 mesh. The brazing alloy may, for example, be an Al-12% Si alloy as heretofore conventionally used for aluminum brazing, or it may be any other aluminum alloy (e.g. of known composition) suitable for brazing and having a melting point appropriately lower than that of the metal of the components to be brazed. Stated in general, and as will be appreciated by those skilled in the art, the brazing alloy used in a particular case is selected, with reference to the metal or metals of the components, to have proper melting point characteristics for brazing, while the specific flux composition used is selected (within the broad compositional ranges stated above) so as to be at least sufficiently molten at the intended brazing temperature to provide effective fluxing action.

Further in accordance with the invention, and as a particularly important feature thereof, the flux and brazing alloy powders are suspended in an aqueous vehicle for application to faying surfaces of components to be brazed. The vehicle consists essentially of water, de-ionized water being found particularly suitable. The relative proportions of brazing alloy powder and flux powder present in the suspension, expressed as a ratio of brazing alloy to flux in parts by weight, must be sufficiently small to provide enough flux for fully effective fluxing action; at the same time, for reasons of economy, it is ordinarily preferred that the proportion of flux used be not substantially greater than the minimum required for the particular operating conditions employed. Although the ratio of brazing alloy to flux, in the practice of the present method, is always greater than one (i.e. the brazing alloy is always a major proportion, and the flux a minor proportion, of the binary mixture of alloy and flux powders), it is found that the optimum value of this ratio in any specific instance is dependent on the weight of coating of the powder mixture applied to the faying surfaces. For example, when the mixture is applied by immersion depositing to provide a coating weight, when dried, of 60 grams per square meter, a brazing alloy/flux ratio of about 4:1 is preferred and the ratio should not exceed about 5:1 in order to ensure the presence of sufficient flux. On the other hand, at a coating weight of 135 grams per square meter, the amount of flux used may be very greatly reduced, and a brazing alloy/flux ratio as high as 40:1 is found to be entirely satisfactory.

The amount of water in which a given weight of the brazing alloy and flux powders is dispensed or suspended is selected to provide a desired consistency for the particular application procedure being used. If the material is being applied to the faying surfaces with a brush or trowel, relatively little water is used, to provide a thick paste-like consistency. On the other hand, for spray application, a much larger proportion of water is used to give a thinner consistency. For the immersion depositing operations hereinafter particularly described, the weight of water employed may be a minor proportion of the total weight of the suspension including both the water and the powders. For example, a suspension in which the water constitutes about ⅜ of the total weight is found to be satisfactory.

The mixture of flux and brazing alloy powders in water may be provided as a bath, in a suitable container or vessel, in which the aluminum components to be brazed are dipped or immersed. In this bath, the particles of flux and alloy powder are maintained in forced suspension e.g. by known techniques such as air agitation or mechanical stirring. Typically, the aluminum components to be brazed, after precleaning of their faying surfaces, may be immersed in the bath while being held in assembled relation, i.e. with the faying surfaces juxtaposed; the bath, including the flux and alloy particles therein suspended, flows between and coats these surfaces. Indeed, the slurry covers the entire assembly, with some considerable concentration of the coating occurring at those areas where two surfaces are in close proximity, i.e. where a brazed joint is desired.

After immersion, the assembly of aluminum components, now coated with the brazing mixture, is removed from the bath and dried to evaporate the water vehicle, leaving (at least on and or adjacent the faying surfaces) a dried coating or layer of the mixture of brazing alloy and flux powders. The fact that the powder mixture is initially applied in an aqueous vehicle renders it sufficiently adherent to the component surfaces to permit the requisite handling of the components (e.g. in placing them in a furnace for brazing) without significant loss of the powder. If desired, the powder coating may be removed from nonfaying surfaces of the components (except at the immediate vicinity of the joint to be formed) prior to application of brazing heat.

The assembled, coated and dried components are next placed in a furnace, advantageously in an inert atmosphere such as an atmosphere of nitrogen gas, and are heated to brazing temperature for a period sufficiently long to effect melting and flowing of the brazing alloy. The components are then cooled, to effect solidification of the brazing alloy and thereby to form a completed brazed joint. This furnace brazing operation may be entirely conventional, performed under conditions well known to those skilled in the art, and accordingly need not be further described.

While, as indicated, the method of the invention in a broad sense may incorporate application of the brazing alloy-flux-water mixture in ways other than by immersion depositing, the immersion depositing operation affords particular advantages from the standpoint of ease and convenience especially for continuous or semicontinuous production of brazed assemblies. That is to say, a series of assemblies to be brazed may be passed in succession through the above-described bath and then through subsequent drying and heating stages, in an effectively continuous manner.

The feature of providing an aqueous suspension of brazing alloy powder and powdered flux having the above-defined composition is particularly advantageous for such immersion depositing operation. Because this specific flux doe not deleteriously attack alloy powder when mixed therewith in water, the powdered flux-alloy bath has a desirably along effective pot life, e.g. a pot life of at least several days or even longer, whereas the use of conventional chloride flux in such a bath with an aqueous vehicle would drastically restrict the pot life owing to attack on the brazing alloy by the chlorides. Indeed, it is found that a slurry in accordance with the present invention which has aged just beyond its pot life can be rejuvenated by a 10% weight addition of the flux and brazing alloy powder mixture.

In a broader sense, the invention also embraces alternative ways of applying the aqueous suspension of flux and alloy powders such as, for example, brushing, trowelling, and spraying. The long pot life of the suspension is advantageous for these alternative applications as well, e.g. facilitating preparation and storage of the brazing mixture in substantial quantities.

If desired, various additions may be made to the aqueous slurry of flux and alloy powders employed in the present invention. For example, conventional surfactants, thickeners, and/or dispersing agents may be employed. In practice, however, satisfactory results have been achieved without resort to any of these additives.

By way of further illustration of the invention, reference may be had to the following specific examples:

EXAMPLE I

One hundred parts by weight of −200 mesh size Al-12% Si brazing alloy powder and 25 parts by weight of −100 mesh size potassium fluoaluminate powder (a mixture of $KAlF_4$ and $K_3AlF_6$) were mixed with 75 parts by weight of de-ionized water and maintained in suspension in the resulting slurry by mechanical stirring. Small specimens of aluminum, 1 inch by 1 inch square with a handling tab, were dipped in the mechanically stirred slurry and withdrawn at a rate such that a uniform deposit of flux and metal powder remained on the surfaces of the specimens. After drying, the coating of flux and brazing alloy powder was removed from all but one surface of each specimen. Coating weights ranging from 30 to 180 grams per square meter were produced in this way, merely by varying the consistency of the slurry by dilution with water. All specimens were successfully brazed in a tube furnace having an atmosphere of dry nitrogen.

In further tests using the above-described procedure with variants in brazing alloy/flux ratio, it appeared that a ratio of 5:1 (parts by weight) was the highest that achieved successful brazing. A 4:1 ratio appeared optimum.

EXAMPLE II

A slurry was prepared consisting of 4 grams of the potassium fluoaluminate flux powder, 160 grams of the Al-Si brazing alloy powder, and 108 ml. of de-ionized water. This slurry was applied to surfaces of aluminum samples so as to achieve a coating weight (after drying) of 135 grams per square meter. Fully effective brazing was achieved with the samples thus coated, although the metal/flux ratio in this instance was 40:1.

It is to be understood that the invention is not limited to the features and embodiments hereinabove specifically set forth but may be carried out in other ways without departure from its spirit.

I claim:

1. A method of joining aluminum surfaces with an aluminum brazing alloy having a melting point lower than that of metal of the surfaces to be joined, comprising a. applying in an aqueous vehicle, to at least one of the surfaces, a mixture of said aluminum brazing alloy in powdered form and a powdered flux consisting essentially of a mixture of potassium fluoaluminate complexes essentially free of unreacted potassium fluoride, said mixture being carried as a solid suspension in said aqueous vehicle, to constitute said mixture as a coating on said one surface;

b. drying said coating to evaporate water therefrom;

c. heating said surfaces and said coating, in juxtaposed relation, to a temperature above the brazing alloy melting point for joining the surfaces to produce a brazed assembly; and d. cooling the brazed assembly to form a solidified joint between the surfaces.

2. A method of joining aluminum surafaces with an aluminum brazing alloy having a melting point lower than that of metal of the surfaces to be joined, comprising a. mixing said brazing alloy in powdered form and a powdered flux consisting essentially of potassium fluoaluminate complexes essentially free of unreacted potassium fluoride with water to form an aqueous slurry of said powdered flux and brazing alloy;

b. applying said slurry to at least one of said surfaces to form a coating of said powdered flux and brazing alloy thereon;

c. drying said coating to evaporate water therefrom;

d. heating said surfaces and said coating, in juxtaposed relation, to a temperature above the brazing alloy melting point for joining the surfaces to produce a brazed assembly; and e. cooling the brazed assembly to form a solidified joint between the surfaces.

3. A method according to claim 2 wherein the mixing step comprises mixing, with said powdered brazing alloy and said water, a powdered flux consisting essentially of potassium fluoaluminate complexes having a composition corresponding to an aluminum fluoride/potassium fluoride ratio, in parts by weight, between about 65:35 and about 45:55.

4. A method according to claim 3, wherein the mixing step comprises mixing, with said powdered brazing alloy and said water, a powdered flux as aforesaid wherein said ratio is between about 60:40 and about 50:50.

5. A method according to claim 2, wherein said mixing step comprises mixing said powdered brazing alloy and said powdered flux in such relative proportions that the ratio of brazing alloy to flux is between about 4:1 and about 40:1.

6. A method according to claim 2, wherein the mixing step comprises mixing with water, powdered brazing alloy and powdered flux as aforesaid, each having a particle size of −100 mesh.

7. A method according to claim 2, wherein the applying step comprises establishing a body of said slurry as a bath and, while maintaining the powdered brazing alloy and powdered flux in suspension in said bath, immersing said one surface therein.

8. A method according to claim 2, wherein said brazing alloy is an Al-Si alloy.

9. In a method of joining plural aluminum components by brazing, with a brazing alloy having a melting point lower than that of metal of the components, the steps of a. establishing a bath consisting essentially of water, said brazing alloy in powdered form, and a powdered flux consisting essentially of potassium fluoaluminate complexes essentially free of unreacted potassium fluoride, the ratio of said brazing alloy to said flux, in parts by weight, in said bath being between about 4:1 and about 40:1, and said powdered brazing alloy and said powdered flux each having a particle size of −100 mesh;

b. immersing said components, in assembled relation, in said bath while maintaining said powdered brazing alloy and said flux in suspension in said bath, for establishing on surfaces of said components, including surfaces which are to be joined by brazing, a coating of said powdered brazing alloy and said flux;

c. after removing said components in assembled relation from the bath, and while maintaining said components in assembled relation, drying said components to evaporate water from said coating;

d. while maintaining said components in assembled relation, heating said components and said coating, in an atmosphere of inert gas, to a temperature above the brazing alloy melting point for joining the components to produce a brazed assembly; and e. cooling the brazed assembly to form a solidified joint between the components.

* * * * *

UNITED STATES PATENT AND TRADEMARK OFFICE

CERTIFICATE OF CORRECTION

PATENT NO. : 3,971,501

DATED : July 27, 1976

INVENTOR(S) : William Ernest Cooke

It is certified that error appears in the above-identified patent and that said Letters Patent are hereby corrected as shown below:

Column 2, line 39, "fluxed" should read --fluxes-- .

Column 4, line 12, "KAlF $_4$" should read --$KAlF_4$-- ;

line 27, "69:40" should read --60:40-- ;

line 57, "$ALF_3$" should read --$AlF_3$-- .

Column 6, line 1, "the" should read --that-- .

Column 7, line 59, before "alloy powder" insert --brazing-- .

Column 9, line 10, "surafaces" should read --surfaces-- .

Signed and Sealed this

*Eighteenth* Day of *April 1978*

[SEAL]

*Attest:*

RUTH C. MASON
*Attesting Officer*

LUTRELLE F. PARKER
*Acting Commissioner of Patents and Trademarks*